United States Patent [19]

Schultz

[11] Patent Number: 6,006,233
[45] Date of Patent: Dec. 21, 1999

[54] METHOD FOR AGGREGATION OF A GRAPH USING FOURTH GENERATION STRUCTURED QUERY LANGUAGE (SQL)

[75] Inventor: Thomas Alan Schultz, Naperville, Ill.

[73] Assignee: Lucent Technologies, Inc., Murray Hill, N.J.

[21] Appl. No.: 09/024,841

[22] Filed: Feb. 17, 1998

Related U.S. Application Data

[63] Continuation-in-part of application No. 08/790,302, Jan. 31, 1997, Pat. No. 5,819,257.

[51] Int. Cl.$^6$ ..................................................... G06F 17/30
[52] U.S. Cl. ................................. 707/101; 707/2; 707/3; 707/4; 707/100; 707/103
[58] Field of Search ............................... 707/2, 3, 4, 103, 707/100, 101

[56] References Cited

U.S. PATENT DOCUMENTS

| | | | |
|---|---|---|---|
| 5,201,046 | 4/1993 | Goldberg et al. | 707/100 |
| 5,377,201 | 12/1994 | Chakradhar et al. | 706/13 |
| 5,659,725 | 8/1997 | Levy et al. | 707/3 |
| 5,694,598 | 12/1997 | Durand et al. | 707/103 |
| 5,701,456 | 12/1997 | Jacopi et al. | 707/4 |
| 5,742,738 | 4/1998 | Koza et al. | 706/13 |

OTHER PUBLICATIONS

Ahmad, I et al., "DPS: dynamic priority scheduling heuristic for heterogeneous computing systems", IEE Proceedings Computers and Digital Techniques, Nov. 1998 vol. 145, Issue: 6, pp. 411–418.

Agrawal, Rakesh et al., "An Access Structure for Generalized Transitive Closure Queries", Proceedings Ninth International Conference on Data Engineering, 1993, Apr. 19–23, 1993, ISBN: 0–8186–3570–3, pp. 429–438.

Dar, Shaul et al., "Extending SQL with Generalized Transitive Closure", IEEE Transactions on Knowledge and Data Engineering, Oct. 1993, vol. 5, Issue 5, pp. 799–812.

Dar, Shaul et al., "Optimization of generalized transitive closure queries", Proceedings Seventh International Conference on Data Engineering, 1991, Apr. 8–12, 1991, ISBN: 0–8186–2138–9, pp. 345–354.

Chakradhar, Srimat et al., "A transitive closure algorithm for test generation", IEEE Transactions on Computer–Aided Design of Integrated Circuits and Systems, Jul. 1993, vol. 12, Issue 7, pp. 1015–1028.

Cruz, Isabel et al. "Aggregative closure: an extension of transitive closure", Proceedings Fifth International Conference on Data Engineering, 1989, Feb. 6–10, 1989, ISBN: 0–8186–1915–5, pp. 384–391.

Eder, Johann, "Extending SQL with general transitive closure and extreme value selections", IEEE Transactions on Knowledge and Data Engineering. vol. 2, Issue: 4, Dec. 1990, pp. 381–390.

*Implementing Generalized Transitive Closure in the Paradise Geographical Information System*, by B. Nag published as TR 1272, University of Wisconsin, Computer Sciences Department, Madison Wisconsin, Jun. 14, 1995.

*Primary Examiner*—Paul R. Lintz
*Assistant Examiner*—Shahid Alam

[57] ABSTRACT

Fourth generation structured query languages can be used to aggregate scalars associated with the nodes of a directed acyclic graph. Node tables, edge tables, and a transitive closure table can be used to perform these aggregate operations. The invention provides a declarative methodolgy for calculating values associated with the node of a directed acyclic graph.

10 Claims, 2 Drawing Sheets

$$\begin{bmatrix} 0 & 1 & 1 & 0 & 0 & 0 \\ 0 & 0 & 0 & 0 & 0 & 0 \\ 0 & 0 & 0 & 1 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

$$\begin{bmatrix} 0 & 1 & 1 & 1 & 1 & 1 \\ 0 & 0 & 0 & 0 & 0 & 0 \\ 0 & 0 & 0 & 1 & 1 & 1 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

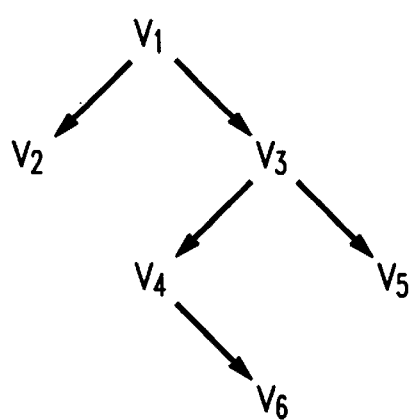
FIG. 1
FIG. 2
$$\begin{bmatrix} 0 & 1 & 1 & 0 & 0 & 0 \\ 0 & 0 & 0 & 0 & 0 & 0 \\ 0 & 0 & 0 & 1 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$
FIG. 3
$$\begin{bmatrix} 0 & 1 & 1 & 1 & 1 & 1 \\ 0 & 0 & 0 & 0 & 0 & 0 \\ 0 & 0 & 0 & 1 & 1 & 1 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$
FIG. 4
$$\begin{bmatrix} 1 & 1 & 1 & 1 & 1 & 1 \\ 0 & 1 & 0 & 0 & 0 & 0 \\ 0 & 0 & 1 & 1 & 1 & 1 \\ 0 & 0 & 0 & 1 & 0 & 1 \\ 0 & 0 & 0 & 0 & 1 & 0 \\ 0 & 0 & 0 & 0 & 0 & 1 \end{bmatrix}$$
FIG. 5
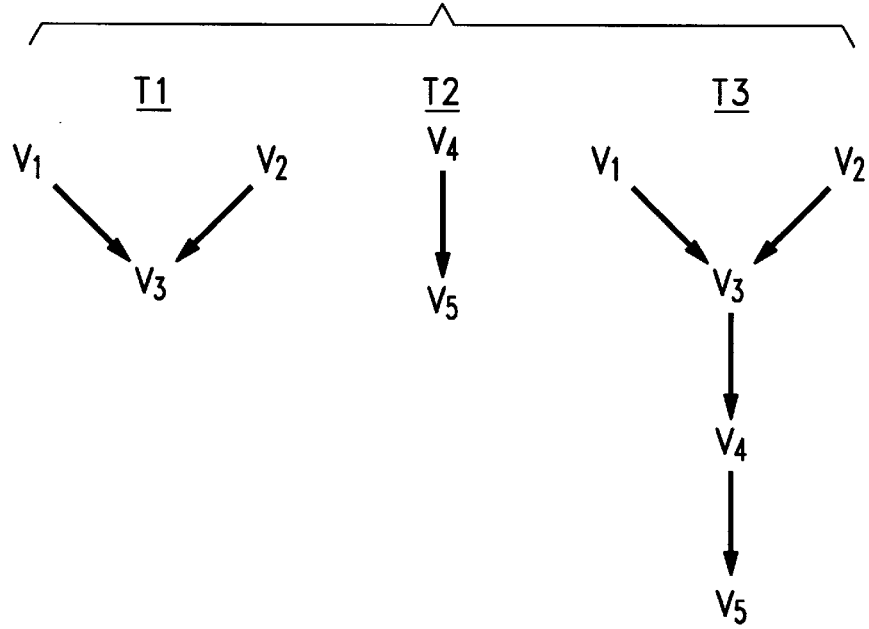

METHOD FOR AGGREGATION OF A GRAPH USING FOURTH GENERATION STRUCTURED QUERY LANGUAGE (SQL)

This is a continuation-in-part of the U.S. patent application Ser. No. 08/790,302 filed Jan. 31, 1997 for: "PROCESS FOR PROVIDING TRANSITIVE CLOSURE USING FOURTH GENERATION STRUCTURED QUERY LANGUAGE (SQL)" U.S. Pat. No. 5,819,257 and which is assigned to Lucent Technologies, Inc.

TECHNICAL FIELD

The invention generally relates to computer relational database systems and to methods and systems for representing and retrieving data from relational databases. In particular, this invention relates to a method and system for aggregating data associated with nodes in a tree or directed acyclical graph. Such methods and systems find use in automated planning and organization software.

DESCRIPTION OF THE PRIOR ART

Many computer software problems today can be modeled as graph problems. One of the classical issues associated with graph problems involves determining the existence of a path between all (source, destination) vertex tuples in a graph. This is the so-called transitive closure problem. There are a number of classical approaches that involve computing the transitive closure of a graph procedurally from a list of graph edges. A number of research efforts have described extended versions of SQL that include operators that execute such procedures such as U.S. Pat. No. 5,201,046 to Goldberg et al.; *Extending SQL with Generalized Transitive Closure Functionality*, by S. Dar and R. Agrawal published in IEEE Transactions on Knowledge and Data Engineering, Vol. 5, No. 5, October 1993; *Extending SQL with Generalized Transitive Closure and Extreme Value Selections*, by J. Eder published by IEEE Transactions on Knowledge and Data Engineering, Vol. 2, No. 4, December 1990; and *Implementing Generalized Transitive Closure in the Paradise Geographical Information System*, by B. Nar published as TR 1272, University of Wisconsin, Computer Science Department, Madison Wis., June 1995.

Deriving the transitive closure for a given a set of vertices $\{V_1 \ldots V_n\}$ comprising the graph, G, is the transitive closure problem. The solution of the transitive closure problem refers to determining for every pair of vertices $(V_i, V_j)$ in G the existence of a path from $V_i$ to $V_j$. Determining the transitive closure of a graph can be part of many real computer database problems. For example, in using a project planning and tracking tool, a manager examining a plan may wish to compute the sum of all the cost or budget items in an organization in which he or she manages. Cost or budget items in an organization can be represented as a organization hierarchical graph. The directed graph might show the structure of the organization. The nodes of the graph can be associated with or assigned scalars representing cost or budget items of the organization represented by the node. Tabulating cost or budget items for an organization requires the scalars associated with nodes be summed or aggregated. The ability to perform an aggregation requires computing a transitive closure, i.e. solving the transitive closure problem and using it to sum the scalar values at descendant nodes.

By deriving the transitive closure for a graph, a number of practical applications can be made of the property.

Consider the tree T as shown in FIG. 1. Tree T can be represented by a binary relation of edges as depicted in the following adjacency matrix R shown in FIG. 2. The columns and rows in the matrix represent vertices $\{V_1, \ldots V_6\}$. A value of 1 in row i column j represents the existence of an edge from $V_i$ to $V_j$. The existence of a path between any two vertices $V_i$ and $V_j$ in T can be represented by the following transitive closure matrix $R^+$, shown in FIG. 3. In FIG. 3 a value of 1 in row i column j represents the existence of a path from $V_i$ to $V_j$. If an implicit path from any vertex $V_i$ to itself is assumed, then the following matrix. $R^*$, shown in FIG. 4, represents the reflexive transitive closure of T.

The Warshall procedure is a classical process for computing the transitive closure of a directed graph of N vertices. The Warshall procedure is:

```
procedure Warshall (var edge: array [1..N, 1..N] of boolean);
var i, j, k: graphindex;
begin
    for i := 1 to N do
        for j := 1 to N do
            if edge[j,i] then
                for k := 1 to N do
                    if edge[i,k] then
                        edge[j,k] := true
    end
end;
```

Note that the procedure of Warshall is procedural and executes in $O(N^3)$ in generating the existence of all paths. Generally speaking, most real-world applications want answers to specific questions, such as 'tell me all descendants of a particular vertex $V_i$'. The $O(N^3)$ Warshall procedure is a wasteful overkill, i.e. it uses a large amount of processor time, in order to answer any specific question.

Instead of representing graph edges as a 2-dimensional array as in the Warshall procedure, a relational database procedure approach involves representing a directed graph as a set of parent-child edges in a relational database table and then using a powerful declarative programming language such as SQL in a recursive algorithm to navigate through the table. Table 1 depicts the edges in tree T shown in FIG. 1.

TABLE 1

| EDGE | |
|---|---|
| Parent | Child |
| $V_1$ | $V_2$ |
| $V_1$ | $V_3$ |
| $V_3$ | $V_4$ |
| $V_3$ | $V_5$ |
| $V_4$ | $V_6$ |

According to this database approach, the following is a pseudo code of a typical 3GL SQL function to compute the descendants of a vertex, $V_i$, from Table 1, the edge table.

```
find_descendants(Vertex V_i) {
    EXEC SQL SELECT child INTO child FROM edge WHERE parent = V_i,
    EXEC SQL BEGIN;
        puts(child);
        find_descendants(child);EXEC SQL END;
}
```

This function according to this database approach is elegant and concise, but solves only one specific query involving all descendants. It does not provide the ability to ask other questions. For example, if the vertices represented tasks in a project plan and contained dates representing when each task was expected to be complete, a manager might want to pose the question "tell me all tasks that are late". Since the above function is written in 3GL, any modifications will require a recompilation of the function.

An equivalent database approach using standard 4GL SQL cannot be implemented. The reason for this is because standard 4GL SQL does not include recursion operations. Some non-standard extension is then sometimes used to provided the recursion. One such a non-standard approach is shown in U.S Pat. No. 5,201,046 issued Apr. 6, 1993 to R. Goldberg et al. mentioned above. Another example of such non-standard SQL extensions is known from the commercial relational database system of Oracle Corporation which has a "connected by" recursive operator.

A non-recursive 4GL SQL solution can be implemented using an edge table, provided the depth of the directed graph is known in advance. The following non-recursive 4GL SQL statement computes the set of descendants of a vertex, $V_i$, from the edge table shown in table 1.

```
select child
    from edge
    where parent = V_i
union select level2.child
    from edge level1, edge level2
    where level1.parent = V_i
    and level2.parent = level1.child
union select level3.child
    from edge level1, edge level2, edge level3
    where level1.parent = V_i
    and level2.parent = level1.child
    and level3.parent = level2.child
```

Note the above presented algorithm has hard-coded knowledge about the fact that Tree T shown in FIG. 1 does not descend beyond 3 levels. An increase or decrease in the number of levels in T potentially breaks the algorithm.

In the above-identified parent application the inventor has already shown a method for use with a computer having a processor, a plurality of storage elements and a display unit, for determining a transitive closure between two verticies of a directed acyclic graph in standard SQL which includes the steps of determining all verticies of the directed acyclic graph, determining an edge table from all of the verticies, deriving a path table from the verticies and the edge table, and from the path table determining at least one transitive closure path between the two if such transitive closure exists.

Accordingly, an object of the present invention is to aggregate scalars associated with graphical edges using a structured query language (SQL).

SUMMARY OF THE INVENTION

A method of graphically aggregating scalars associated with the nodes in a tree graph is comprised of the steps that include: compiling a list of nodes and edges in a directed acyclic graph and scalar values associated with the nodes; a transitive closure table is generated using a fourth generation structured query language process described in the above-identified patent application; aggregating scalars associated from a node in the graph using transitive closure is performed by: first identify entries in the transitive closure table that are for parent nodes; second for each parent node compiling list of descendant nodes; third, for each descendant node, summing scalars values associated with each descendant node.

BRIEF DESCRIPTION OF THE DRAWINGS

FIG. 1 is a diagram of a tree of verticies

FIG. 2 is an edge table of the tree shown in FIG. 1.

FIG. 3 is a table showing by binary representation the transitive closures between the verticies of the tree shown in FIG. 1.

FIG. 4 is a table showing by binary representation the reflecsive closures between the verticies of the tree shown in FIG. 1.

FIG. 5 shows another tree of vertices and the creation of an edge in this tree upon adding vertices to this tree.

DETAILED DESCRIPTION OF THE PREFERRED EMBODIMENT

Figure 6:
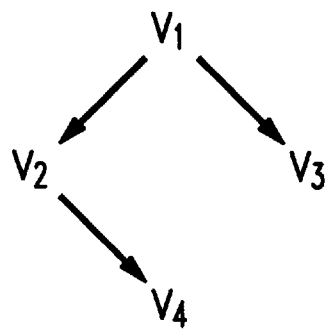
FIG. 6. illustrates a directed graph.

Referring again to FIG. 1, the reflexive transitive closure of tree T according to the present invention can be represented by path table 2. Each record represents the existence of a path from a source vertex to a destination vertex.

TABLE 2

| PATH | |
|---|---|
| Source | Destination |
| $V_1$ | $V_1$ |
| $V_1$ | $V_2$ |
| $V_1$ | $V_3$ |
| $V_1$ | $V_4$ |
| $V_1$ | $V_5$ |
| $V_1$ | $V_6$ |
| $V_2$ | $V_2$ |
| $V_3$ | $V_3$ |
| $V_3$ | $V_4$ |
| $V_3$ | $V_5$ |
| $V_3$ | $V_6$ |
| $V_4$ | $V_4$ |
| $V_4$ | $V_6$ |
| $V_5$ | $V_6$ |
| $V_6$ | $V_6$ |

This innovative representation of reflexive transitive closure permits a standard SQL statement to now be written to derive the descendants of a vertex, $V_i$, as follows:

select destination from path where source=V_i

It is noteworthy that the query immediately above does not break if vertices are added to or deleted from the graph. This query has the advantage of always being correct regardless of the number of levels added or deleted.

Having explained the value of representing the reflexive transitive closure of a directed graph as a table in a relational database, it will be appreciated that powerful general queries can be written using standard SQL. Such queries require little or no maintenance because unlike the known methods, hard-coded knowledge about the corresponding graph does not have to be specified in the queries. The challenge that remains, however, is providing the ability to maintain the reflexive transitive closure of such a graph as vertices and edges are added to and deleted from a graph.

The maintenance operations that are commonly necessary include: creating a vertex, creating an edge, deleting an edge, and deleting a vertex. Each of these four maintenance operations will be described below in the context of examining trees and directed acyclic graphs using the path and edge tables, i.e. Tables 2 and 1 respectively.

Creating a New Vertex in a Tree

Creating a new vertex in a tree requires one record inserted into the path table (Table 2) as follows.

insert into path (source, destination) values (V_i, V_i)

Creating an Edge in a Tree

Creating an edge in a tree between vertices and requires an insertion into the edge table (Table 2) as follows.

insert into edge (parent, child) values (V_i, V_j)

Modifications are also required in the path table (Table 2 reflecting the creation of a new edge.) To understand the needed modifications, consider the following example. Suppose there are 2 graph components, T1 and T2, and you wish to connect of T1 to of T2 in order to form T3 as in FIG. 5.

Let $V_i \otimes V_j$ symbolize the change in the path table representing an edge from $V_i$ to $V_j$.

Table 3 shows the corresponding path table for T1 and T2 and the records added to it representing $V_3 \otimes V_4$.

TABLE 3

| Source | Destination | | |
|--------|-------------|---|---|
| path | | | |
| $V_1$ | $V_1$ | | |
| $V_1$ | $V_3$ | T1 | |
| $V_2$ | $V_2$ | | |
| $V_2$ | $V_3$ | | |
| $V_3$ | $V_3$ | | T3 |
| $V_4$ | $V_4$ | | |
| $V_4$ | $V_5$ | T2 | |
| $V_5$ | $V_5$ | | |
| $V_1$ | $V_4$ | | |
| $V_1$ | $V_5$ | | |
| $V_2$ | $V_4$ | | |
| $V_2$ | $V_5$ | $V_3 \otimes V_4$ | |
| $V_3$ | $V_4$ | | |
| $V_3$ | $V_5$ | | |

To compute $V_i \otimes V_j$, every source vertex where $V_i$ is a destination is crossed with every destination vertex where $V_j$ is a source. For the example in FIG. 5, this corresponds to:

$$V_i \otimes V_j = \{V_1, V_2, V_3\} X \{V_4, V_5\}$$
$$= \{(V_1, V_4), (V_1, V_5), (V_2, V_4), (V_2, V_5), (V_3, V_4), (V_3, V_5)\}$$

which is exactly $V_3 \otimes V_4$ as shown in Path Table 3. The 4GL SQL required to insert records into the path table (Table 3) corresponding to $V_i \otimes V_j$ is as follows.

insert into path
        select p1.source, p2.destination
        from path p1, path p2
        where p1.destination = V_i and p2.source = V_j Deleting an Edge in a Tree Deleting an edge in a tree from vertex $V_i$ to vertex $V_j$ requires a delete from the edge table (Table 1) as follows.

delete from edge where parent=V_i and child=V_j

The same cross product used in supporting insertion of records into the path table is used to support deletion of records from the path table (Table 3). The corresponding 4GL SQL is as follows.

delete from path
        select p1.source, p2.destination
        from path p1, path p2
        where p1.destination = V_i and p2.source = V_j Deleting a Vertex in a Tree Deleting a vertex in a tree requires record deletes in the edge table (Table 1) as follows.

delete from edge where parent=V_i or child=V_i

The records to delete in the path table (Table 7), reflecting the deletion of an edge from $V_i$ to $V_j$, are derived as follows.

delete from path
        select p1.source, p2.destination
        from path p1, path p2
        where p1.destination = V_i and p2.source = V_i Directed Acyclic Graphs It can be shown that attempting to apply the tree maintenance algorithms to a directed acyclic graph in which the path between a source vertex and destination vertex is not unique causes the algorithms to break. For example, consider the directed acyclic graph shown in FIG. 6. If the path table already has unique indices and an attempt is made to create an edge from $V_3$ to $V_4$, the insert will fail because the tuple $(V_1, V_4)$ already exists for the path $V_1 V_2 V_4$. If the path table is not uniquely indexed, the tuple $(V_1, V_4)$ will appear twice in the Table 4 path table.

TABLE 4

PATH

| Source | Destination |
|---|---|
| $V_1$ | $V_1$ |
| $V_2$ | $V_2$ |
| $V_3$ | $V_3$ |
| $V_4$ | $V_4$ |
| $V_1$ | $V_2$ |
| $V_1$ | $V_3$ |
| $V_2$ | $V_4$ |
| $V_3$ | $V_4$ |
| $V_1$ | $V_4$ |
| $V_1$ | $V_4$ |

A problem is revealed when attempting to delete the edge from $V_3$ to $V_4$. The delete edge process will delete both ($V_1$, $V_4$) tuples from the path table (Table 4), even though the path $V_1$ $V_2$ $V_4$ still exists. To address this problem for directed graphs in which a (source, destination) tuple is not unique, a path_count attribute is used. In the following sections, the use of path_count to support reflexive transitive closure maintenance of directed acyclic graphs is explained.

Creating a New Vertex in a Directed Acyclic Graph

Creating a new vertex in a directed acyclic graph require0s one record inserted into the path table (with path_count) as follows.

insert into path (source, destination, path_count) values ($V_i$, $V_i$, 1)

Creating an Edge in a Directed Acyclic Graph

Creating an edge in a directed acyclic graph between vertices $V_i$ and $V_j$ requires an insertion into the edge table as follows.

insert into edge (parent, child) values ($V_i$, $V_j$)

Once the path_count attribute is introduced, one can no longer simply insert records into the path table reflecting the creation of an edge. Instead, an update to increment the path_count of any pre-existing paths must be performed. In creating an edge from vertex $V_i$ to vertex $V_j$, an attempt is made to find all ($V_s$, $V_t$) tuples in the path table where $V_s$ is an ascendant of $V_i$ and $V_t$ is a descendant of $V_j$. For each ($V_s$, $V_t$) tuple found, its current path_count value is incremented by the path_count of ($V_s$, $V_i$) times the path_count of ($V_j$, $V_t$). The following SQL statements modify the path table in representing the creation of an edge from source vertex $V_i$ to destination vertex $V_j$.

```
update path p1
    from path p2, path p3
    set path_count = p1.path_count + (p2.path_count*p3.path_count)
    where p2.destination = V_i and p1.source = p2.source
    and p3.source = V_j and p1.destination = p3.destination
```

The update handles pre-existing paths. To represent paths that are not pre-existing, inserts must be performed as follows.

```
insert into path
    select p1.source, p2.destination, p1.path_count*p2.path_count
    from path p1, path p2
    where p1.destination = V_i and p2.source = V_j
    and not exists (select source, destination from path
        where source = p1.source and destination = p2.destination)
```

Deleting an Edge in a Directed Acyclic Graph

Deleting an edge in a directed acyclic graph from vertex $V_i$ to vertex $V_j$ requires a delete from the edge table as follows.

delete from edge where parent=$V_i$ and child=$V_j$

In deleting an edge from vertex $V_i$ to vertex $V_j$, an attempt is made to find all ($V_s$, $V_t$) tuples in the path table where $V_s$ is an ascendant of $V_i$ and $V_t$ is a descendant of $V_j$. For each ($V_s$, $V_t$) tuple found, its current path_count value is decremented by the path_count of ($V_s$, $V_i$) times the path_count of ($V_j$, $V_t$). The following SQL statements modify the path table in representing the deletion of an edge from source vertex $V_i$ to destination vertex $V_j$.

```
update path p1
    from path p2, path p3
    set path_count = p1.path_count - (p2.path_count*p3.path_count)
    where p2.destination = V_i and p1.source = p2.source
    and p3.source = V_j and p1.destination = p3.destination
```

Having decremented the path_count of all affected paths, next all path tuples where path_count=0 are deleted, reflecting the deletion of paths. The 4GL SQL statement to perform this is as follows.

```
delete from path
    where source in (select source from path where destination = V_i)
    and destination in (select destination from path where source = V_j)
    and path_count = 0
```

Deleting a Vertex in a Directed Acyclic Graph

Deleting a vertex in a directed acyclic graph requires record deletes in the edge table as follows.

delete from edge where parent=$V_i$ or child=$V_i$

The records to delete in the path table are equivalent to the deleting an edge from $V_i$ to $V_i$ as follows.

```
update path p1
    from path p2, path p3
    set path_count = p1.path_count - (p2.path_count * p3.path_count)
    where p2.destination = V_i and p1.source = p2.source
    and p3.source = V_i and p1.destination = p3.destination
delete from path
    where source in (select source from path where destination = V_i)
    and destination in (select destination from path where source = V_i)
    and path_count = 0
```

Directed Cyclic Graphs

It can be shown that the procedures to maintain reflexive transitive closure for directed acyclic graphs break when applied to directed cyclic graphs.

Figure 7:
FIG. 7 illustrates a directed acyclic graph.

Consider the directed graph shown in FIG. 7 which shows a graph with two vertices ($V_1$, $V_2$) and a directed path from $V_1$ to $V_2$. The corresponding path table (Table 5) appears as follows.

TABLE 5

| Source | Destination | Path_count |
|---|---|---|
| $V_1$ | $V_1$ | 1 |
| $V_2$ | $V_2$ | 1 |
| $V_1$ | $V_2$ | 1 |

Figure 8:
FIG. 8 illustrates the directed acyclic graph shown in FIG. 7 after an additional edge has been created.
Figure 9:
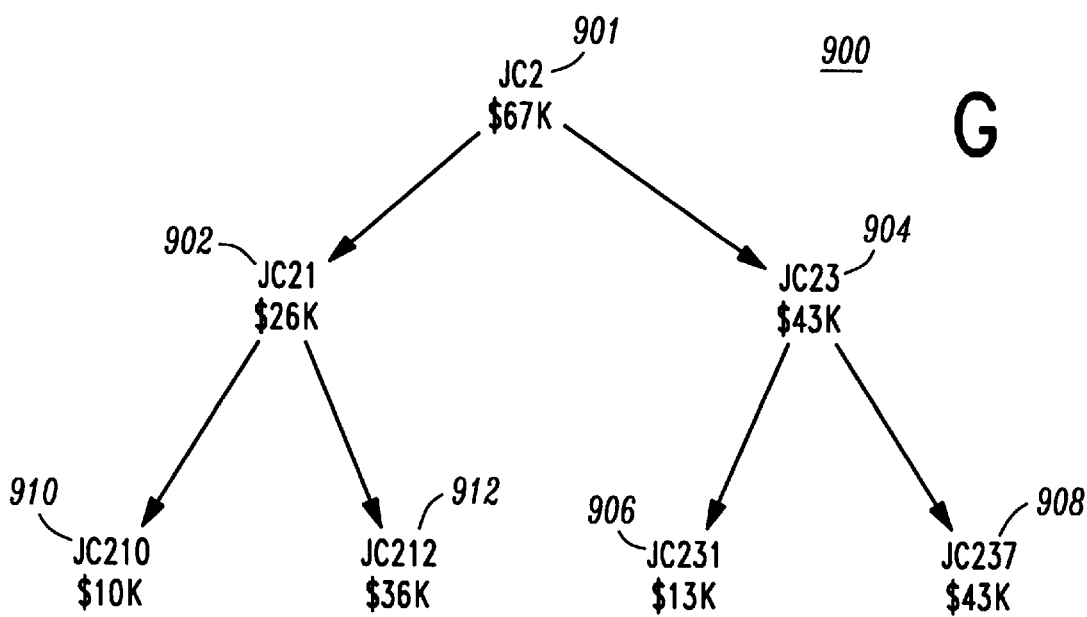
FIG. 9 illustrates another directed acyclic graph.

Now assume an edge from $V_2$ to $V_1$ as shown in FIG. 8 is added to FIG. 9. The path table corresponding to FIG. 8 will appear as follows in Table 6.

TABLE 6

| Source | Destination | Path_count |
|---|---|---|
| $V_1$ | $V_1$ | 2 |
| $V_2$ | $V_2$ | 2 |
| $V_1$ | $V_2$ | 2 |
| $V_2$ | $V_1$ | 4 |

Note that even though the graph in FIG. 9 visually appears symmetric, the path table shows a bias in path_count for tuple ($V_2$, $V_1$). This looks bothersome and, indeed, becomes troublesome if the edge from $V_2$ to $V_1$ is deleted. The corresponding path table (Table 7) will appear as follows.

TABLE 7

| Source | Destination | Path_count |
|---|---|---|
| $V_1$ | $V_1$ | −2 |
| $V_2$ | $V_2$ | −2 |
| $V_1$ | $V_2$ | −2 |

The expectation was to assume that the operations of creating an edge from $V_2$ to $V_1$ and deleting the edge from $V_2$ to $V_1$ were inverse operations that would leave the path table as shown in Table 5. The fact that the state of the path table is different indicates that the maintenance procedures for directed acyclic graphs don't work for directed cyclic graphs. This is shown as a limit of the present invention in that maintenance of the reflexive transitive closure for directed cyclic graphs is beyond the immediate scope of the present invention.

Automation of Path Table Maintenance

Most commercial relational databases support rules and procedures for automation of path maintenance. Each of the path table SQL statements described previously can be encapsulated into SQL procedures, all in accordance with the present invention. One way to automate is to define database rules that are activated whenever a vertex or edge is added or deleted. The activation of a rule then causes the appropriate path table maintenance procedures to start executing. For instance, if the following rule is defined in a database system, such as Ingres®, the rule is activated into action whenever a record is inserted into the edge table.

```
create rule edge_insert after insert of edge table
    execute procedure path.insert (parent=NEW.parent, child=NEW.child)
``` with path_insert also defined in a database system (such as Ingres) as follows:

```
create procedure path_insert (parent integer4, child integer4)
BEGIN
    insert into path
        select p1.source, p2.destination
        from path p1, path p2
        where p1.destination=:parent
        and p2.source=:child;
END;
```

Graph Aggregation

FIG. 9 shows a directed acyclic graph (900). The upper most node (901) has two child nodes (902) and (904). From FIG. 9 it can be seen that node 902 has two child nodes 906 and 908. Accordingly the nodes 902, 904, 906, 908, 910, and 912 are all descendants of node 900. A scalar representing a dollar value is associated with each node in the graph (900). The scalar values assigned to the nodes shown in FIG. 9 are arbitrary and for illustrative purposes only.

Graphically aggregating scalars associated with a tree graph or a directed acyclical graph using a fourth generation structured query language uses the methods disclosed above and requires the construction of a node/scalar table (Table 8) from the graph 900 shown in FIG. 9. Table 8 lists nodes and associated scalars, which in FIG. 9 are shown as dollar values.

TABLE 8

| NODE | |
|---|---|
| Node | Cost |
| 901 | $67 |
| 902 | $26 |
| 904 | $43 |
| 910 | $10 |
| 912 | $36 |
| 906 | $13 |
| 908 | $43 |

Next a table listing graphical edges, i.e. the graphical segments, between each parent and each child node is constructed (Table 9).

TABLE 9

| EDGE | |
|---|---|
| Parent_node | Child_node |
| 901 | 902 |
| 901 | 904 |
| 902 | 910 |
| 902 | 912 |
| 904 | 906 |
| 904 | 908 |

Using the process described above, a path table is constructed using a Structured Query Language to construct a path table (Table 10), the mere presence of each record in the table represents the existence of some path from the parent to a child node.

The table of nodes and associated costs (scalars) is set forth below as table 10.

TABLE 10

PATH

| Parent_node | Child_node | Path_count |
|---|---|---|
| 901 | 901 | 1 |
| 901 | 902 | 1 |
| 901 | 910 | 1 |
| 902 | 902 | 1 |
| 902 | 910 | 1 |
| 902 | 912 | 1 |
| 910 | 910 | 1 |
| 912 | 912 | 1 |
| 901 | 904 | 1 |
| 904 | 906 | 1 |
| 904 | 908 | 1 |
| 906 | 906 | 1 |
| 908 | 908 | 1 |
| 901 | 910 | 1 |
| 901 | 912 | 1 |
| 901 | 906 | 1 |
| 901 | 908 | 1 |

An aggregate roll up can be performed using standard structured query language using SQL statements:

```
select sum(n.cost) as total from path p, node n
where p.parent_node = '901' and n.node = p.child_node
```

Using Tables (8, 9 and 10) the foregoing SQL query produces a result:

TABLE 11

| Total |
|---|
| 238,000 |

Even though the graph G is a hierarchy, the creation and maintenance of the path table (Table 10) applies to directed acyclic graphs as well. Therefore, the standard SQL aggregate roll up is applicable to both hierarchies and directed acyclic graphs.

In the foregoing example, the aggregate SQL operator is the sum operator. Those skilled in the art will recognize that operators other than the sum operator could be used.

The general case SQL query takes the form:

```
select <aggregate operator>(n.<attribute>) from path p, node n
where p.parent_node=<starting_node> and n.node = p.child_node
``` where the aggregate operators can include: count (for the number of occurrences); sum (for a columnar total); avg (for an average=sum/count); max (for the maximum value in a column); and min (for a minimum value in a column).

Using a relational database table to represent reflexive transitive closure a relational database table to represent nodes in a directed acyclic graph and associated scalar values, and a relational database table to represent edges of a directed acyclical graph, a variety of aggegate operations can be performed on any acyclic directed graph using a standard structured query language (SQL).

I claim:

1. A method of aggregating scalars associated with nodes in a directed acyclic graph, at least some of the nodes having associated parent and descendant nodes, said method comprised of:

i) compiling a list of nodes in said directed acyclic graph and scalar values associated with said nodes;

ii) compiling a list of edges in said directed acyclic graph;

iii) generating a transitive closure table using a fourth generation structured query language process;

iv) aggregating scalars associated from at least one node in said directed acyclic graph from said transitive closure table by:

a) identifying all entries in said table wherein said predetermined node is a parent;

b) compiling descendant nodes of parent nodes;

c) for each descendant node, aggregating scalar values associated with each descendant node.

2. The method of claim 1 wherein said step of aggregating scalars associated from at least one node in said graph from said transitive closure table includes the step of: calculating an arithmetic average scalar value.

3. The method of claim 1 wherein said step of aggregating scalars associated from at least one node in said graph from said transitive closure table includes the step of: calculating an arithmetic count of scalar values.

4. The method of claim 1 wherein said step of aggregating scalars associated from at least one node in said graph from said transitive closure table includes the step of: calculating an arithmetic sum scalar value.

5. The method of claim 1 wherein said step of aggregating scalars associated from at least one node in said graph from said transitive closure table includes the step of: calculating maximum scalar value from said scalars.

6. The method of claim 1 wherein said step of aggregating scalars associated from at least one node in said graph from said transitive closure table includes the step of: calculating minimum scalar value from said scalars.

7. A method of aggregating scalars associated with nodes in a tree graph, at least some of the nodes having associated parent and descendant nodes, said method comprised of:

i) compiling a list of nodes in said directed acyclical graph and scalar values associated with said nodes;

ii) compiling a list of edges of said tree graph;

iii) generating a transitive closure table using a fourth generation structured query language process;

iv) aggregating scalars associated from at least one node in said tree graph from said transitive closure table by:

a) identifying all entries in said table wherein said predetermined node is a parent;

b) compiling descendant nodes of parent nodes;

c) for each descendant node, aggregating scalar values associated with each descendant node.

8. The method of claim 7 wherein said step of aggregating scalars associated from at least one node in said graph from said transitive closure table includes the step of: calculating an arithmetic average scalar value.

9. The method of claim 7 wherein said step of aggregating scalars associated from at least one node in said graph from said transitive closure table includes the step of: calculating maximum scalar value from said scalars.

10. The method of claim 7 wherein said step of aggregating scalars associated from at least one node in said directed acyclical graph from said transitive closure table includes the step of: calculating minimum scalar value from said scalars.

* * * * *